US010246056B1

(12) United States Patent
Goldberg et al.

(10) Patent No.: US 10,246,056 B1
(45) Date of Patent: Apr. 2, 2019

(54) VEHICLE THEFT PREVENTION BASED ON FUELING PATTERN (71) Applicant: INTERNATIONAL BUSINESS MACHINES CORPORATION, Armonk, NY (US)

(72) Inventors: Itzhack Goldberg, Hadera (IL); Harry R. McGregor, Tucson, AZ (US); Christopher B. Moore, Vail, AZ (US); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/820,744

(22) Filed: Nov. 22, 2017

(51) Int. Cl.
*B60R 25/33* (2013.01)
*B60R 25/102* (2013.01)
*B60R 25/10* (2013.01)

(52) U.S. Cl.
CPC ............ *B60R 25/33* (2013.01); *B60R 25/102* (2013.01); *B60R 2025/1016* (2013.01); *B60R 2325/105* (2013.01); *B60R 2325/108* (2013.01)

(58) Field of Classification Search
CPC .... G06Q 20/20; G06Q 20/40; G06Q 20/3278; B67D 7/145; B67D 7/348
USPC .......................................... 340/426.1, 572.1
See application file for complete search history.

(56) References Cited

U.S. PATENT DOCUMENTS

| | | | |
|---|---|---|---|
| 6,085,805 A | 7/2000 | Bates | |
| 6,470,233 B1 | 10/2002 | Johnson, Jr. | |
| 7,474,942 B2 | 1/2009 | Patenaude | |
| 7,565,307 B1 | 7/2009 | Pinkus | |
| 8,115,656 B2 | 2/2012 | Bevacqua et al. | |
| 2006/0292984 A1 | 12/2006 | Teate et al. | |
| 2009/0289113 A1* | 11/2009 | Vilnai | B67D 7/34 235/381 |
| 2012/0191242 A1* | 7/2012 | Outwater | G06Q 30/06 700/236 |
| 2015/0352947 A1 | 12/2015 | Hubschman et al. | |

(Continued)

OTHER PUBLICATIONS

SCI, "Fuel Shield", 2011, 2 pages, http://www.sciww.net/index.php/fuel-management/rfid.

(Continued)

*Primary Examiner* — Mirza F Alam
(74) *Attorney, Agent, or Firm* — Sean M. Douglass (57) ABSTRACT

An embodiment of the invention may include a method, computer program product and computer system for optimizing course understanding. The method, computer program product and computer system may include a computing device to receive fueling location data and vehicle identification data of a vehicle from a radio frequency identification (RFID) transceiver from a plurality of fueling stations. The RFID transceiver may receive the vehicle identification data at the RFID transceiver from a cryptographic RFID transponder as part of the vehicle. The computing device may receive user authentication signals authorizing a plurality of fueling stations from an authorized user of the vehicle. The computing device may determine from the fueling location data, the vehicle identification data, and the user authentication signals one or more fueling patterns. The computing device may detect a fueling location deviating from the one or more fueling patterns send an alert to an authorized device.

20 Claims, 6 Drawing Sheets

(56) References Cited

U.S. PATENT DOCUMENTS

2016/0364718 A1* 12/2016 Betancourt ........ G06Q 20/3278
2017/0178257 A1* 6/2017 Tingler .............. G06K 7/10297

OTHER PUBLICATIONS

Swedberg, "Love's Tries RFID for Automating Fuel Payments", RFID Journal, Sep. 9, 2011, pp. 1-2.
SCI, "Fuel Management, RFID—Overview", printed Nov. 21, 2017, 1 page, http://www.sciww.net/index.php/fuel-management/rfid.
Mell et al., "The NIST Definition of Cloud Computing", Recommendations of the National Institute of Standards and Technology, Special Publication 800-145, Sep. 2011, 7 pages.

* cited by examiner

VEHICLE THEFT PREVENTION BASED ON FUELING PATTERN

BACKGROUND

The present invention relates generally to a method, system, and computer program for preventing vehicle theft. More particularly, the present invention relates to a method, system, and computer program for preventing vehicle theft based on fueling patterns.

Vehicle theft is a major issue around the world resulting in over $4 billion USD worth of loss each year. While vehicle anti-theft systems are now standard on most cars, they can be easily found and disabled. Further, current vehicle anti-theft systems are largely ignored due to their prevalence and ease of being triggered. Also, anti-theft systems lack the ability to alert a car owner directly if the car has been stolen. However, many countries now have a system where vehicles are equipped with cryptographically unique identifiers that can be read wirelessly by a fueling station to charge the vehicle owner for the cost of the fuel and identify/track the fueling processed. These cryptographic identifiers are mainly used as a convenience for fleet vehicles where the fuel is billed to the owning company, but the may be leveraged for preventing vehicle theft.

BRIEF SUMMARY

An embodiment of the invention may include a method, computer program product and computer system for optimizing course understanding. The method, computer program product and computer system may include a computing device may receive fueling location data and vehicle identification data of a vehicle from a radio frequency identification (RFID) transceiver from a plurality of fueling stations. The RFID transceiver may receive a signal at the RFID transceiver at each of the plurality of fueling stations from a cryptographic RFID transponder as part of the vehicle the vehicle identification data, at a server communicating with the RFID transceiver using a communication network. The computing device may receive a plurality of user authentication signals authorizing a plurality of fueling stations from an authorized user of the vehicle. The computing device may determine from the received fueling location data, the received vehicle identification data, and the received user authentication signals one or more fueling patterns. The computing device may detect a fueling location deviating from the one or more fueling patterns and send an alert to an authorized device of the detection of the vehicle fueling location deviating from the one or more fueling patterns.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
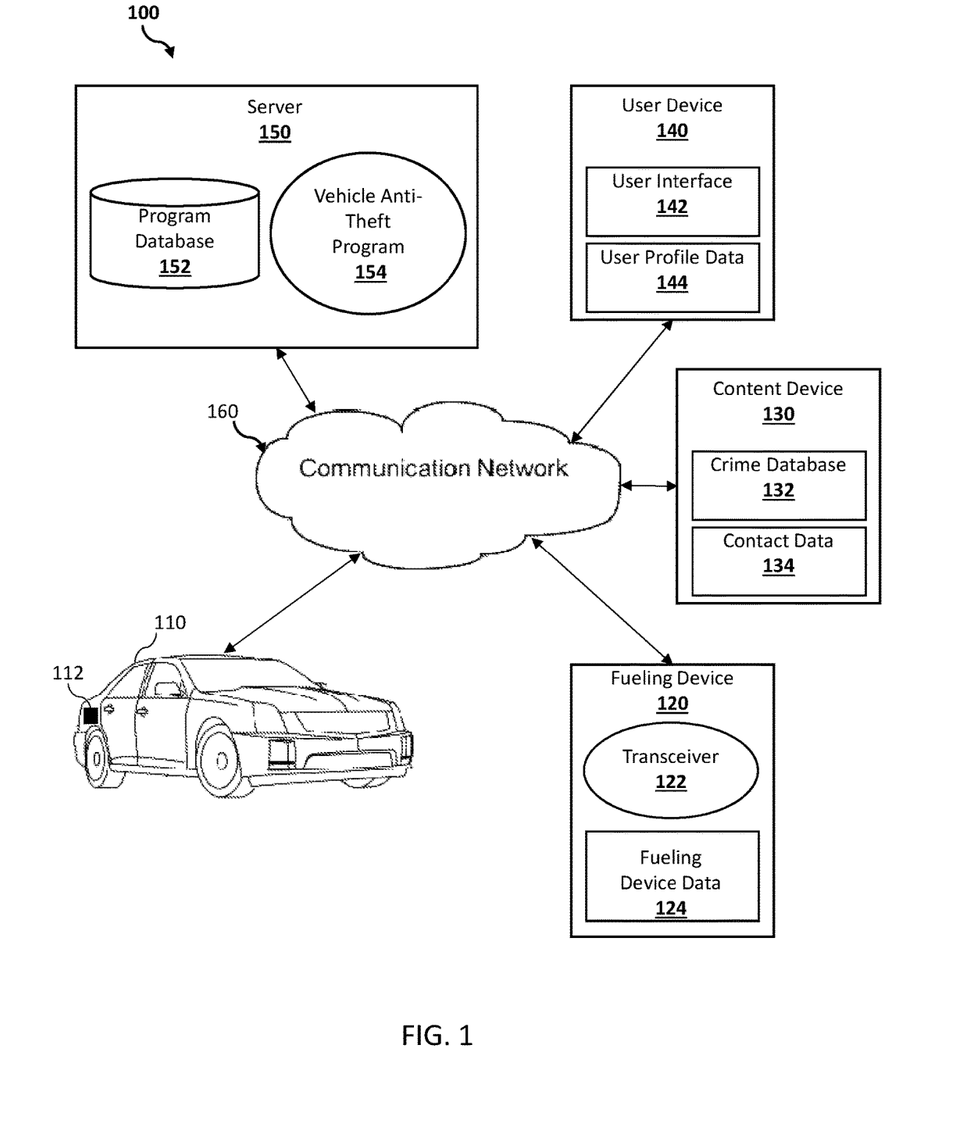
FIG. 1 illustrates a system for vehicle theft prevention, in accordance with an embodiment of the invention.

FIG. 1 illustrates a vehicle anti-theft system 100, in accordance with an embodiment of the invention. In an example embodiment, vehicle anti-theft system 100 includes a vehicle 110, fueling device 120, a content device 130, a user device 140, and a server 150 interconnected via network 160.

In the example embodiment, network 160 is the Internet, representing a worldwide collection of networks and gateways to support communications between devices connected to the Internet. Network 160 may include, for example, wired, wireless or fiber optic connections. In other embodiments, network 160 may be implemented as an intranet, a local area network (LAN), or a wide area network (WAN). In general, network 160 can be any combination of connections and protocols that will support communications between vehicle 110, fueling device 120, content device 130, user device 140, and server 150.

Vehicle 110 may be any motor vehicle including, but not limited to, a passenger car, a motorcycle, a commercial vehicle, or any other motor vehicle requiring a commercial energy product such as, but not limited to, gas and electricity.

Vehicle 110 may include transponder 112. Transponder 112 may be any device capable of transmitting a signal with vehicle data to a transceiver including, but not limited to, a cryptographic radio frequency identification (RFID) transponder. Further, transponder 112 may communicate with a transceiver using a cryptographic handshake protocol such as, but not limited to, Transport Layer Security (TLS) or Secure Sockets Layer (SSL). The vehicle data transmitted by transponder 112 may include, but is not limited to, vehicle make, vehicle model, vehicle year, vehicle license plate number, vehicle owner name, and vehicle owner contact information. Transponder 112 may be permanently installed on vehicle 110 or transponder 112 may be removably installed in vehicle 110. In an embodiment of the invention, transponder 112 may be hidden on vehicle 110. For example, transponder 112 may be installed during the manufacturing process of vehicle 110 to prevent tampering with transponder 112.

Fueling Device 120 may be any commercial motor vehicle fueling device including, but not limited to, gas pumps and electric charging stations. Fueling device 120 may include transceiver 122 for receiving vehicle data from transponder 112 on vehicle 110. Transceiver 122 may transmit the vehicle data along with fueling device data 124 to server 150. Transceiver 122 may be any device capable of receiving a signal from transponder 112 and transmitting that data along with the fueling device data 124 to server 150 including, but not limited to, a radio frequency identification (RFID) reader using a cryptographic handshake protocol such as, but not limited to, Transport Layer Security (TLS) or Secure Sockets Layer (SSL). Fueling device data 124 transmitted by transceiver 122 may include, but is not limited to, the location of fueling device 120 and the time and date the signal from vehicle 110 was received at fueling device 120. Further, vehicle anti-theft system 100 may include one or more fueling devices.

Content device 130 may contain crime database 132 and contact data 134. Content device 130 may be a desktop computer, a notebook, a laptop computer, a tablet computer, a handheld device, a smart-phone, a thin client, or any other electronic device or computing system capable of storing audio, visual, or textual content and receiving and sending that content to and from other computing devices such as vehicle 110, fueling device 120, user device 140, and server 150 via network 160. In some embodiments, content device 130 includes a collection of devices, or data sources. Crime database 132 may be any existing crime database such as, but not limited to, newspaper crime databases, police crime databases, national crime databases, or any other crime database containing crime statistics that links crime to a location. Contact data 134 may contain the contact information for local law enforcement, such as, but not limited to, police phone numbers, police e-mail addresses, and police station street addresses. Further, vehicle anti-theft system 100 may include one or more content devices. Content device 130 is described in more detail with reference to FIG. 4.

User device 140 may include user interface 142, for example, a graphical user interface. User device 140 may also include user profile data 144. User device 140 may be a desktop computer, a notebook, a laptop computer, a tablet computer, a handheld device, a smart-phone, a cellular phone, a landline phone, a thin client, or any other electronic device, computing system, wired device, or wireless device capable of receiving and sending content to and from other computing devices, such as vehicle 110, fueling device 120, content device 130, and server 150 via network 160. Further, vehicle anti-theft system 100 may include one or more user devices. User device 140 is described in more detail with reference to FIG. 4.

User interface 142 includes components used to receive input from a user on user device 140 and transmit the input to vehicle anti-theft program 154 residing on server 150, or conversely to receive information from vehicle anti-theft program 154 and display the information to the user on user device 140. In an example embodiment, user interface 142 uses a combination of technologies and devices, such as device drivers, to provide a platform to enable users of user device 140 to interact with vehicle anti-theft program 154. In the example embodiment, user interface 142 receives input, such as but not limited to, textual, visual, or audio input received from a physical input device, such as but not limited to, a keypad and/or a microphone.

User profile data 144 may include, but is not limited to, vehicle data as described above, an authorized list of fueling devices 120, and user preferences. User preferences may include manually entered boundary parameters for what may constitute out of band, i.e. unauthorized, fueling attempts by vehicle 110. For example, a user may create a list of authorized fueling devices 120, but may also authorize any fueling device within a specified distance from the authorized list of fueling devices 120. Further, a user may customize the parameters vehicle anti-theft program 154 uses to notify law enforcement. For example, a user may set a mileage threshold from authorized fueling devices 120 required before alerting law enforcement. Thus, if fueling of vehicle 110 is attempted within the mileage threshold set by the user, vehicle anti-theft program 154 would not automatically notify law enforcement that vehicle 110 has been stolen. User profile data 144 may also identify the typical times and dates of fueling attempts by vehicle 110 at the list of authorized fueling devices 120.

Server 150 includes vehicle anti-theft program 154 and program database 152. In the example embodiment, Server 150 may be a desktop computer, a notebook, a laptop computer, a tablet computer, a thin client, or any other electronic device or computing system capable of storing compiling and organizing audio, visual, or textual content and receiving and sending that content to and from other computing devices, such as vehicle 110, fueling device 120, content device 130, and user device 140, via network 160. Server 150 is described in more detail with reference to FIG. 4.

Program database 152 may include a collection of vehicle data received from vehicle 110 and/or user device 140, fueling device data 124 received from fueling device 120, crime data received from content device 130, and law enforcement contact data 134 received from content device 130. Further, program database 152 may include a collection of fueling patterns for vehicle 110 computed using vehicle anti-theft program 154 on server 150.

Vehicle anti-theft program 154 is a program capable of analyzing and recognizing fueling patterns of vehicle 110. The fueling patterns may include, but are not to, commonly used fueling locations and common fueling days and times. Vehicle anti-theft program 154 may also recognize multiple fueling patterns for vehicle 110 such as, but not limited to, weekday fueling patterns, weekend fueling patterns, seasonal fueling patterns, and holiday fueling patterns. The fueling patterns may be analyzed over a period of time set by vehicle anti-theft program 154 and/or by a user. For example, a user may set the time for analyzing fueling patterns for vehicle 110 to last one month from the date of purchase of a vehicle 110. In another example, vehicle anti-theft program 154 may have a one month time period for analyzing fueling patterns for vehicle 110 beginning from the date of first use of vehicle anti-theft system 100. It can be appreciated that any time period can be set by vehicle anti-theft program 154 or by the user. Further, vehicle anti-theft program 154 may send authorization requests to an owner or authorized user of vehicle 110 if vehicle 110 attempts to get fuel from a fueling device 120 outside of a known fueling pattern, i.e. an out of band fueling attempt. The owner or authorized user of vehicle 110 may respond to the authorization request using user device 140 in several ways including, but not limited to, authorizing the out of band fueling attempt temporarily, authorizing the out of band fueling attempt permanently, declining the out of band fueling attempt, adding the out of band fueling device to a block list to ban all future fueling attempts at that out of band fueling device, or alerting law enforcement, such as the police, that vehicle 110 has been stolen.

In an embodiment of the invention, vehicle anti-theft program 154 may alert law enforcement that vehicle 110 has been stolen based on several factors including, but not limited to, an out of band fueling attempt, an abnormal time of fueling, the location of an out of band fueling device in relation to a high crime area, etc. For example, vehicle anti-theft program 154 may send an authorization request to an authorized user of vehicle 110 due to an attempt to fuel at an unauthorized fueling device 120 late at night in a high crime area. Due to the discrepancy between the unauthorized fueling device 120 and the known fueling pattern for vehicle 110, vehicle anti-theft program 154 may alert law enforcement that vehicle 110 has been stolen. In an embodiment of the invention, vehicle anti-theft program 154 may alert law enforcement located near to the location where vehicle 110 may have been stolen, i.e. the location of the out of band fueling attempt. Vehicle anti-theft program 154 may alert law enforcement automatically if the authorized user fails to respond to the authentication request or the authorized user responds to the authentication request indicating law enforcement should be contacted. A user may disable automatic law enforcement notification by vehicle anti-theft program 154. Vehicle anti-theft program 154 may also save the fueling location data of the unauthorized fueling device 120 to program database 152 for future reference to assist in the recovery of vehicle 110 if it has indeed been stolen.

Figure 2:
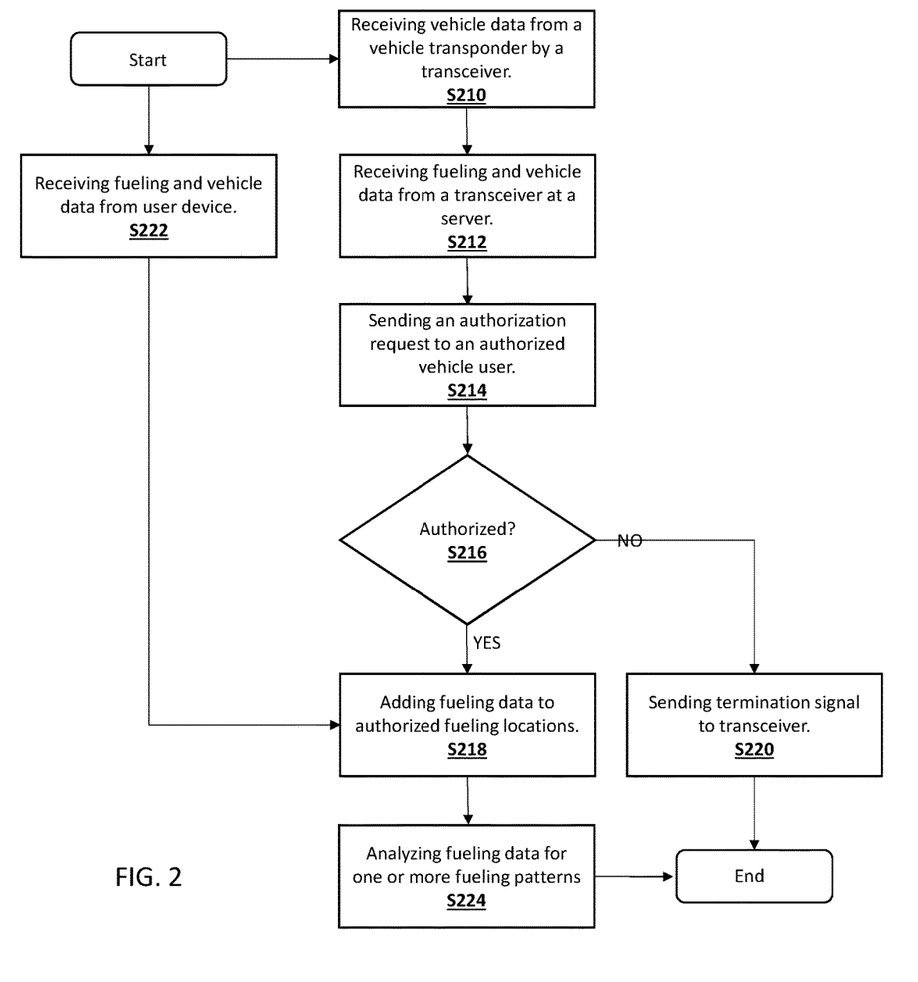
FIG. 2 is a flowchart illustrating a method of detecting a fueling pattern, in accordance with an embodiment of the invention.

FIG. 2 is a flowchart illustrating a method for detecting a fueling pattern, in accordance with an embodiment of the invention.

Referring to step S210, a transceiver on fueling device 120 receives a fueling request from a transponder 112 on vehicle 110. The fueling request may include, but is not limited to vehicle data. For example, vehicle 110 may be a gas-powered passenger car and attempt to fuel at a fueling device 120, a commercial gas station. Transponder 112 on vehicle 110 would communicate with transceiver 122 on fueling device 120 via network 160 and transmit the vehicle data of vehicle 110.

Referring to step S212, server 150 receives the vehicle data and fueling device data 124 from the transceiver on a fueling device 120. In the above example, fueling device 120 would transmit the received vehicle data from vehicle 110 along with the fueling device data 124 of fueling device 120 over network 160 to server 150.

Referring to step S214, server 150 sends an authorization request to an authorized user of vehicle 110. For example, vehicle anti-theft program 154 may send the authorized user of vehicle 110, identified using the vehicle data, a notification, i.e. an authorization request, that vehicle 110 is attempting to fuel at fueling device 120.

Referring to step S216, an authorized user either verifies or denies the authorization request. For example, the authorized user of vehicle 110 may indicate that vehicle 110 should be allowed to fuel at fueling device 120 or that vehicle 110 should not be able fuel at fueling device 120.

Referring to step S218, if an authorized user verifies the authorization request, vehicle anti-theft program 154 adds fueling device 120 to a list of authorized fueling locations stored on server 150.

Referring to step S220, if an authorized user denies the authorization request, vehicle anti-theft program 154 sends a termination signal to fueling device 120.

Referring to step S222, server 150 may receives an authorization for fueling device 120 on user device 140. For example, an authorized user may enter authorized fueling devices 120 using user interface 142 on user device 140. An authorized user may enter fueling devices the authorized user typically uses with vehicle 110. For example, an authorized user may add fueling devices 120 that are close to the user's home and/or office.

Referring to step S224, vehicle anti-theft program 154 analyzes all authorized fueling devices 120 for vehicle 110 for a pattern. Vehicle anti-theft program 154 may analyze the fueling devices 120 used by vehicle 110 over a set period of time as discussed above. For example, vehicle anti-theft program 154 may analyze the fueling devices 120 used by vehicle 110 over the course of one month time period that could be set by the user or predefined. Vehicle anti-theft program 154 may recognize during that one month that vehicle 110 primarily fuels at two fueling devices 120. The first fueling device 120 may be close to the user's home while the second is close to the user's office.

Figure 3:
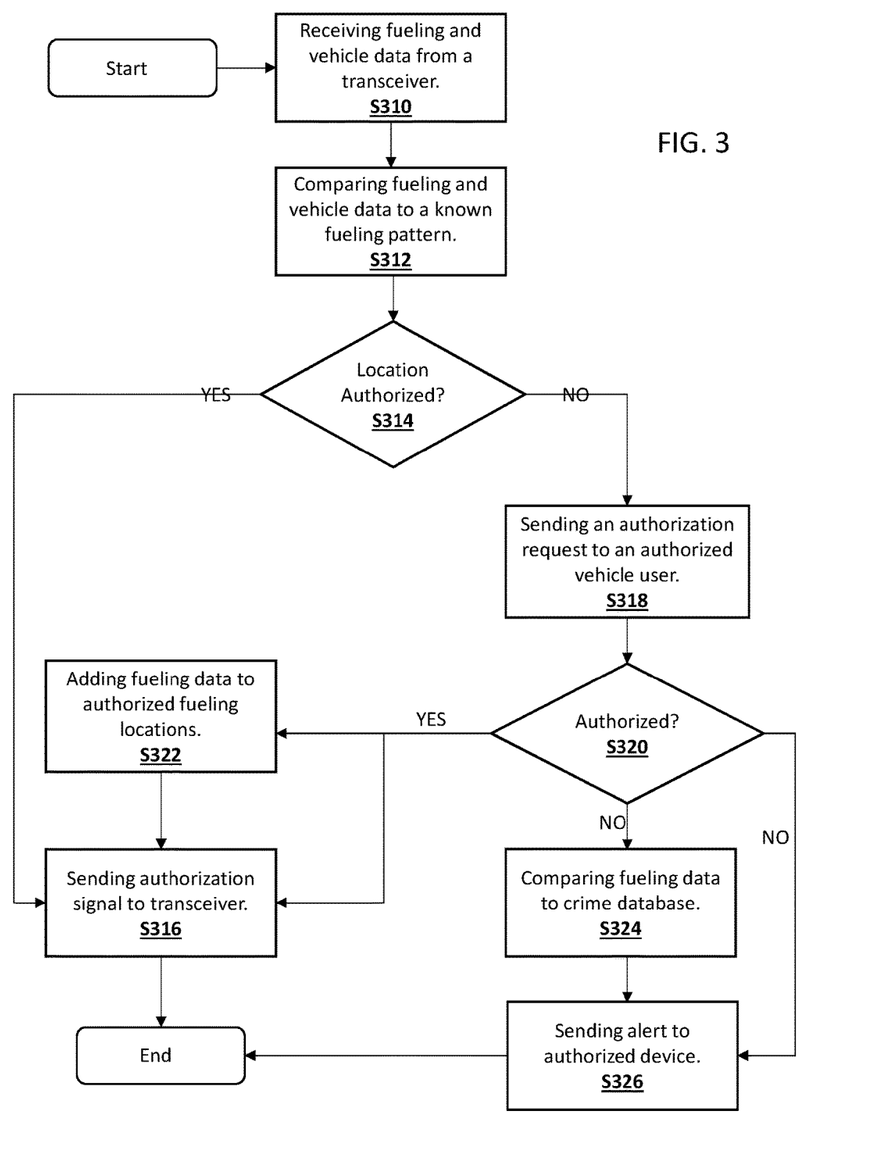
FIG. 3 is a flowchart illustrating an example method of vehicle theft prevention based fueling patterns, in accordance with an embodiment of the invention.

FIG. 3 is a flowchart illustrating an example method of vehicle theft prevention based fueling patterns, in accordance with an embodiment of the invention.

Referring to step S310, vehicle anti-theft program 154 receives a fueling request from fueling device 120. Referring to step S312, vehicle anti-theft program 154 compares the fueling device data 124 from fueling device 120 to the known fueling pattern for vehicle 110. Referring to step S314, vehicle anti-theft program 154 confirms or denies the authorization request as coming from an authorized fueling device 120. Referring to step S316, vehicle anti-theft program 154 sends an authorization signal to fueling device 120 if fueling device 120 is authorized.

Referring to step S318, vehicle anti-theft program 154 sends an authorization request to an authorized user of vehicle 110 if fueling device 120 is not part of the fueling pattern for vehicle 110.

Referring to step S320, an authorized user verifies or denies the authorization request. The authorized user may authorize fueling device 120 on a temporary basis or on a permanent basis, i.e. add fueling device 120 to the fueling pattern of vehicle 110.

Referring to step S322, vehicle anti-theft program 154 adds fueling device 120 to the list of authorized fueling devices 120 associated with the fueling pattern of vehicle 110. This step only occurs if an authorized user of vehicle 110 chooses to permanently add fueling device 120 to the fueling pattern of vehicle 110. When an authorized user of vehicle 110 chooses to temporarily add fueling device 120, i.e. authorize a one-time use, vehicle anti-theft program 154 proceeds to step S316 as described above.

Referring to step S324, vehicle anti-theft program 154 compares the fueling device data 124 to crime database 132 if fueling device 120 is not authorized by the authorized user of vehicle 110. For example, crime database 132 may indicate that unauthorized fueling device 120 is in a high crime area. Thus, there is an increased likelihood that vehicle 110 has been stolen.

Referring to step S326, vehicle anti-theft program 154 sends an alert to an authorized device. The authorized device may include, but is not limited to, user device 140. In an embodiment of the invention, vehicle anti-theft program 154 may send an alert to law enforcement.

Figure 4:
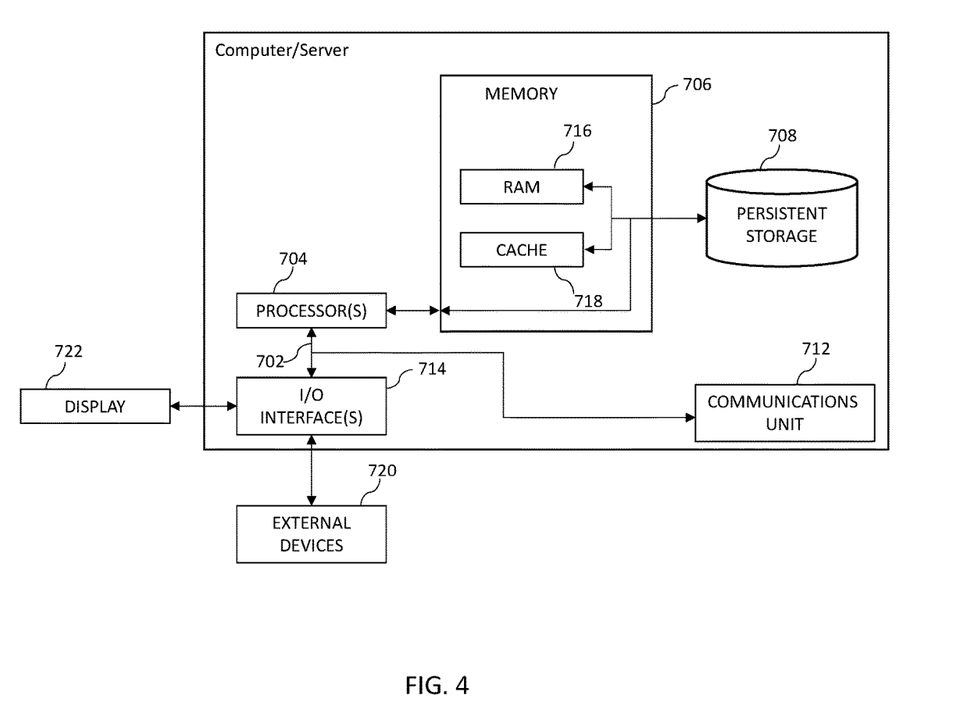
FIG. 4 is a block diagram depicting the hardware components of the vehicle theft prevention system of FIG. 1, in accordance with an embodiment of the invention.

FIG. 4 depicts a block diagram of components, shown in the form of a generic computing device, of vehicle 110, fueling device 120, content device 130, user device 140, and server 150, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Vehicle 110, fueling device 120, content device 130, user device 140, and server 150 may include communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

The programs vehicle anti-theft program 154 and program database 152 in server 150; user interface 142 and user profile data 144 stored in user device 140; crime database 132 and contact data 134 stored in content device 130, transceiver 122 and fueling device data 124 in fueling device 120; and transponder 112 in vehicle 110 are stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. The programs vehicle anti-theft program 154 and program database 152 in server 150; user interface 142 and user profile data 144 stored in user device 140; crime database 132 and contact data 134 stored in content device 130, transceiver 122 and fueling device data 124 in fueling device 120; and transponder 112 in vehicle 110 may be downloaded to persistent storage 708 through communications unit 712.

I/O interface(s) 714 allows for input and output of data with other devices that may be connected to vehicle 110, fueling device 120, content device 130, user device 140, and server 150. For example, I/O interface 714 may provide a connection to external devices 720 such as a keyboard, keypad, a touch screen, and/or some other suitable input device. External devices 720 can also include portable computer-readable storage media such as, for example, thumb drives, portable optical or magnetic disks, and memory cards. Software and data used to practice embodiments of the present invention, e.g., the programs of vehicle anti-theft program 154 and program database 152 in server 150; user interface 142 and user profile data 144 stored in user device 140; crime database 132 and contact data 134 stored in content device 130, transceiver 122 and fueling device data 124 in fueling device 120; and transponder 112 in vehicle 110, can be stored on such portable computer-readable storage media and can be loaded onto persistent storage 708 via I/O interface(s) 714. I/O interface(s) 714 can also connect to a display 722.

Display 722 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
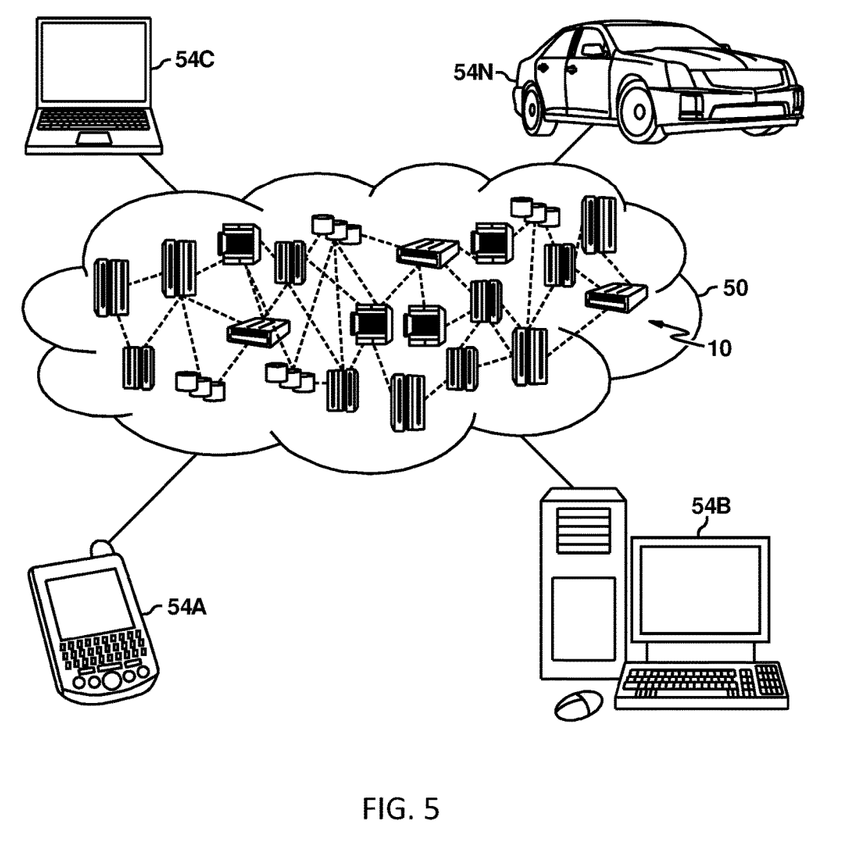
FIG. 5 illustrates a cloud computing environment, in accordance with an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
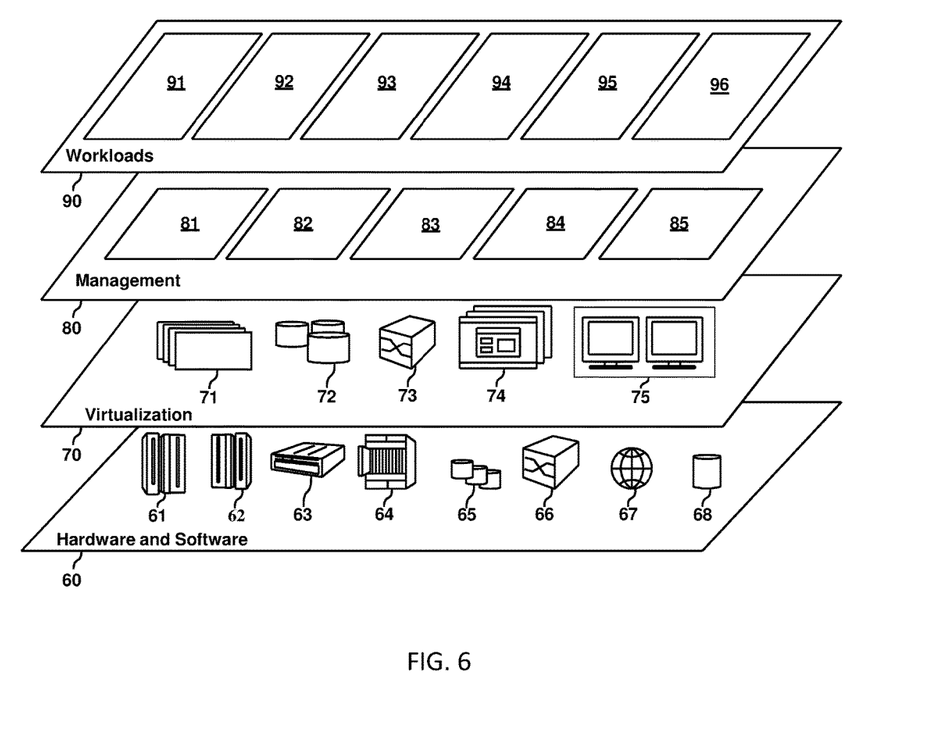
FIG. 6 illustrates a set of functional abstraction layers provided by the cloud computing environment of FIG. 5, in accordance with an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle anti-theft 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for vehicle theft prevention, the method comprising:
   receiving, at a server, fueling location data and vehicle identification data of a vehicle from each of a plurality of radio frequency identification (RFID) transceivers situated at each of a respective plurality of fueling stations, the RFID transceivers situated at each of the plurality of fueling stations receiving a signal from a cryptographic RFID transponder as part of the vehicle identification data, the server communicating with the RFID transceivers using a communication network;
   receiving by the server, from an authorized user of the vehicle, a plurality of user authentication signals authorizing a corresponding plurality of fueling stations;
   determining from the received fueling location data, the received vehicle identification data, and the received user authentication signals, one or more fueling patterns;
   detecting a fueling location from the received fueling location data deviating from the one or more fueling patterns; and
   sending an alert to a user authorized device of the detection of the fueling location deviating from the one or more fueling patterns.

2. A method as in claim 1, wherein the RFID transceiver and the RFID transponder communicate using a cryptographic handshake protocol.

3. A method as in claim 1, wherein the one or more fueling patterns comprises fueling station location data of the plurality of fueling stations.

4. A method as in claim 1, wherein the one or more fueling patterns comprises days and times of fueling authorized by the user at the plurality of fueling stations by the vehicle.

5. A method as in claim 1, further comprising:
   comparing the fueling location deviating from the one or more fueling patterns to a crime database comprising crime statistics, wherein the crime database corresponds to an area comprising the fueling location deviating from the one or more fueling patterns; and
   sending an alert to law enforcement near the fueling location deviating from the one or more fueling patterns.

6. A method as in claim 1, wherein the alert to the authorized device is sent based on the distance outside the one or more fueling patterns the fueling location deviating from the one or more fueling patterns is situated, and the distance of the fueling location deviating from the one or more fueling patterns to an area of high crime.

7. A method as in claim 1, wherein the alert to the user authorized device allows a user to allow or deny fueling at the fueling location deviating from the one or more fueling patterns.

8. A computer program product for vehicle theft prevention, the computer program product comprising:
   a computer-readable storage device and program instructions stored on computer-readable storage device, the program instructions comprising:
   program instructions to receive, at a server, fueling location data and vehicle identification data of a vehicle from each of a plurality of radio frequency identification (RFID) transceivers situated at each of a respective plurality of fueling stations, the RFID transceivers situated at each of the plurality of fueling stations receiving a signal from a cryptographic RFID transponder as part of the vehicle identification data, the server communicating with the RFID transceivers using a communication network;
   program instructions to receive by the server, from an authorized user of the vehicle, a plurality of user authentication signals authorizing a corresponding plurality of fueling stations;
   program instructions to determine from the received fueling location data, the received vehicle identification data, and the received user authentication signals, one or more fueling patterns;
   program instructions to detect a fueling location from the received fueling location data deviating from the one or more fueling patterns; and
   program instructions to send an alert to a user authorized device of the detection of the fueling location deviating from the one or more fueling patterns.

9. A computer program product as in claim 8, wherein the RFID transceiver and the RFID transponder communicate using a cryptographic handshake protocol.

10. A computer program product as in claim 8, wherein the one or more fueling patterns comprises fueling station location data of the plurality of fueling stations.

11. A computer program product as in claim 8, wherein the one or more fueling patterns comprises days and times of fueling authorized by the user at the plurality of fueling stations by the vehicle.

12. A computer program product as in claim 8, further comprising:
   comparing the fueling location deviating from the one or more fueling patterns to a crime database comprising crime statistics, wherein the crime database corresponds to an area comprising the fueling location deviating from the one or more fueling patterns; and
   sending an alert to law enforcement near the fueling location deviating from the one or more fueling patterns.

13. A computer program product as in claim 8, wherein the alert to the authorized device is sent based on the distance outside the one or more fueling patterns the fueling location deviating from the one or more fueling patterns is situated, and the distance of the fueling location deviating from the one or more fueling patterns to an area of high crime.

14. A computer program product as in claim 8, wherein the alert to the user authorized device allows a user to allow or deny fueling at the fueling location deviating from the one or more fueling patterns.

15. A computer system for vehicle theft prevention, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive, at a server, fueling location data and vehicle identification data of a vehicle from each of a plurality of radio frequency identification (RFID) transceivers situated at each of a respective plurality of fueling stations, the RFID transceivers situated at each of the plurality of fueling stations receiving a signal from a cryptographic RFID transponder as part of the vehicle identification data, the server communicating with the RFID transceivers using a communication network;

program instructions to receive by the server, from an authorized user of the vehicle, a plurality of user authentication signals authorizing a corresponding plurality of fueling stations;

program instructions to determine from the received fueling location data, the received vehicle identification data, and the received user authentication signals, one or more fueling patterns;

program instructions to detect a fueling location from the received fueling location data deviating from the one or more fueling patterns; and program instructions to send an alert to an authorized device of the detection of the fueling location deviating from the one or more fueling patterns.

16. A computer system as in claim 15, wherein the RFID transceiver and the RFID transponder communicate using a cryptographic handshake protocol.

17. A computer system as in claim 15, wherein the one or more fueling patterns comprises days and times of fueling authorized by the user at the plurality of fueling stations by the vehicle.

18. A computer system as in claim 15, further comprising:
comparing the fueling location deviating from the one or more fueling patterns to a crime database comprising crime statistics, wherein the crime database corresponds to an area comprising the fueling location deviating from the one or more fueling patterns; and
sending an alert to law enforcement near the fueling location deviating from the one or more fueling patterns.

19. A computer system as in claim 15, wherein the alert to the authorized device is sent based on the distance outside the one or more fueling patterns the fueling location deviating from the one or more fueling patterns is situated, and the distance of the fueling location deviating from the one or more fueling patterns to an area of high crime.

20. A computer system as in claim 15, wherein the alert to the user authorized device allows a user to allow or deny fueling at the fueling location deviating from the one or more fueling patterns.

* * * * *